May 10, 1955
H. J. GUMB ET AL
2,707,983
HORIZONTALLY POSITIONED TRANSVERSELY
RECIPROCATING MEAT CUTTER
Filed May 1, 1950
3 Sheets-Sheet 1
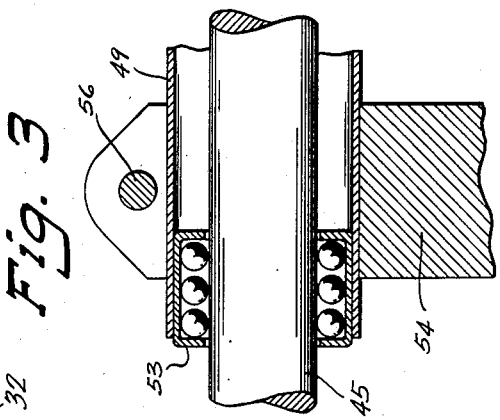
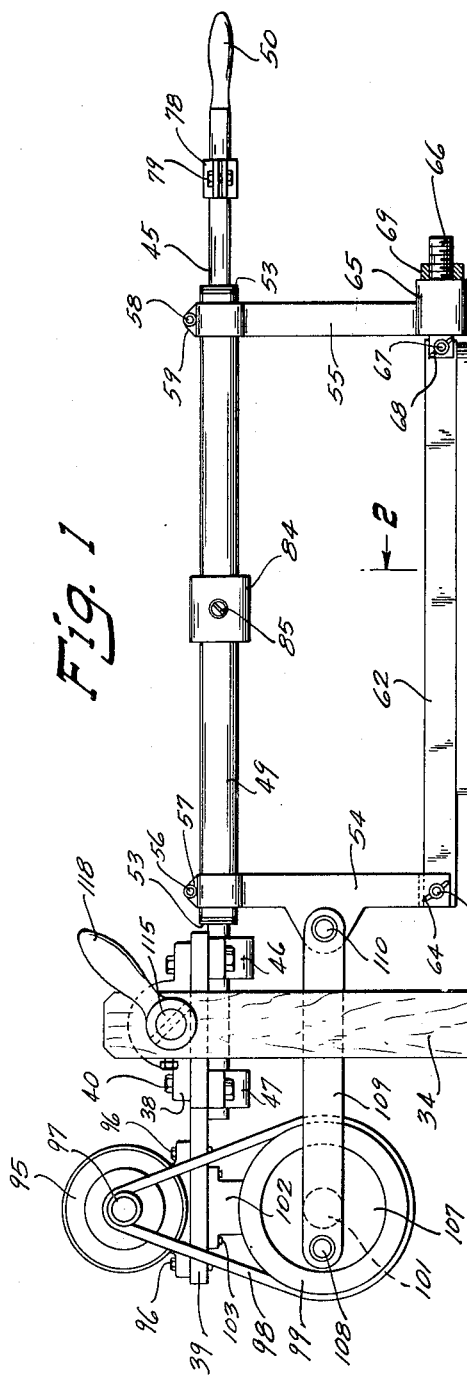
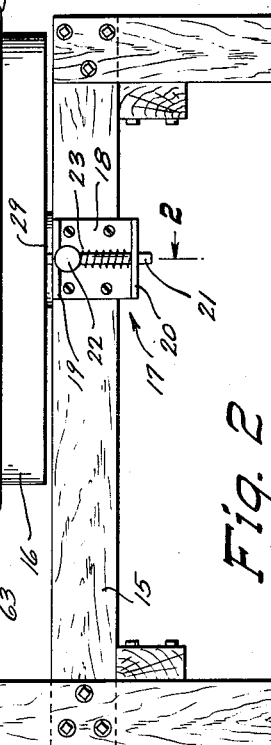
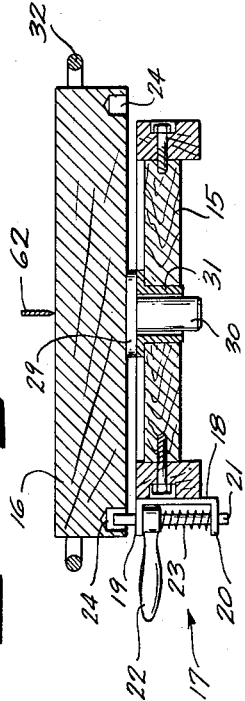
INVENTORS.
Harry J. Gumb, and
Nordahl J. Halverson
BY
Cyril M. Hajewski
Attorney

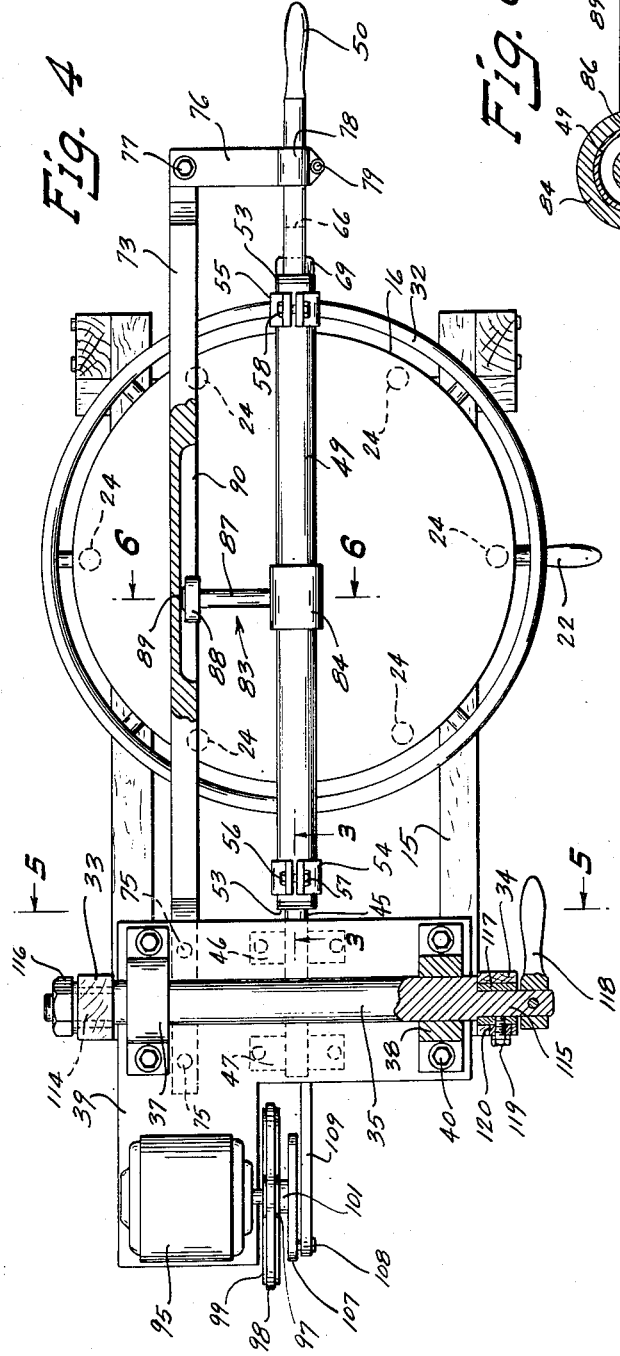

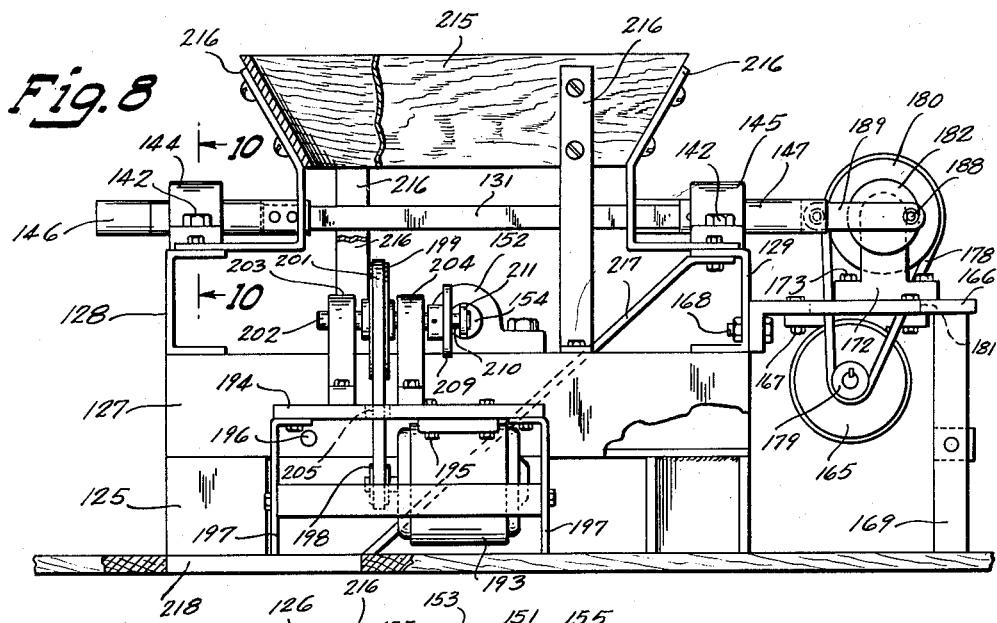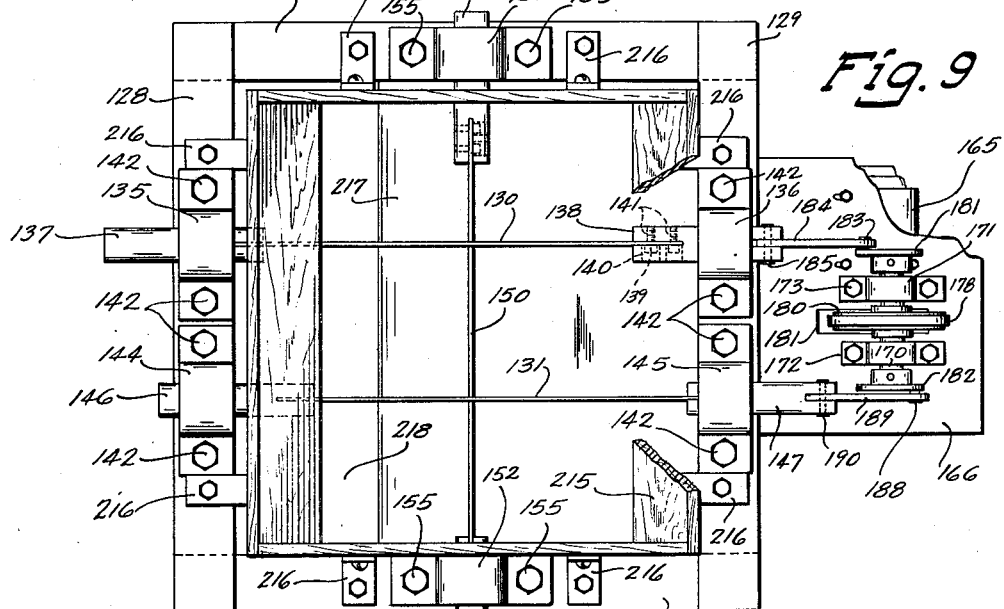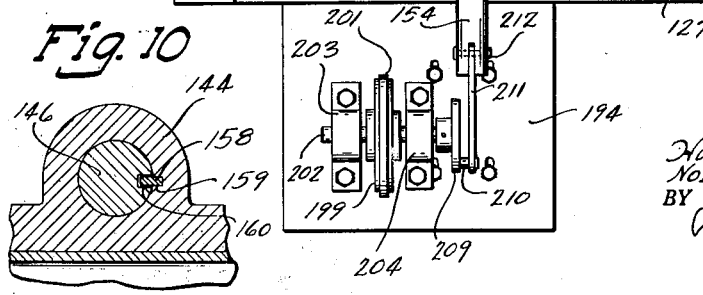

2,707,983

HORIZONTALLY POSITIONED TRANSVERSELY RECIPROCATING MEAT CUTTER

Harry J. Gumb and Nordahl J. Halverson, Milwaukee, Wis.

Application May 1, 1950, Serial No. 159,326

1 Claim. (Cl. 146—151)

This invention relates generally to meat cutting machines and more particularly to an improved machine for cutting the omasum or first stomach of beef cattle.

A general object of this invention is to provide an improved machine for cutting fleshy material.

In the slaughtering of beef cattle, the omasum, more commonly referred to by the trade as the "peck," is processed for the production of inedible tallow and livestock feed. The tallow is used for the manufacture of soap. The residue remaining after the removal of the tallow is utilized as a feed for livestock.

The initial operation in processing the peck is to cut it into pieces for insertion into a hashing machine from which it is passed into a washer for removal of contaminants. In performing the initial cutting operation it is important that each piece include a portion of the outer membrane of the peck to hold it together and prevent the undigested food from combining with the other material. If the undigested food is permitted to combine with the other material it is difficult to remove in the washing process. Failure to efficiently remove this undigested food results in an objectionable green cast in the tallow, rendering it inferior in quality, unsuitable for use in the manufacture of high grade soaps.

It is therefore the purpose of this invention to provide an improved machine for performing the initial cutting operation in processing the omasum of beef cattle for the production of tallow and beef.

Another object of the invention is to provide a machine for cutting a mass of meat into wedge shaped pieces.

Another object of the invention is to provide an improved machine for rapidly cutting a large mass of meat into small portions with a minimum of physical effort.

Another object is to provide an improved machine for cutting a mass of meat so that each piece includes a portion of the outer surface of the original mass.

A further object is to provide an improved machine for cutting a mass of meat in a manner so that each portion is held together by the membranous material covering the original mass.

A still further object is to provide an improved machine for cutting the peck of beef cattle, which is economical to construct and simple to operate without danger of injury to the operator.

According to this invention the machine is comprised of one or more reciprocating knives arranged to cut the peck into pieces so that each piece includes a portion of the outer membrane of the peck to hold the material together. The knives are actuated in their reciprocatory movement by suitable motors connected to drive a crank which converts the revolving motion of the motor into reciprocatory motion for driving the knives. A connecting rod connects each knife to the crank by means of a crank pin and as the motor is energized the power is transmitted through the crank and connecting rod to actuate the knives. When only one knife is used the peck is placed on a rotary table arranged to be indexed into six positions. The knife supporting and driving mechanism is mounted to pivot unitarily on a shaft. After the peck is placed on the table the reciprocating knife is pivoted downwardly through the peck and then allowed to return to its upward position. With the knife thus clear of the peck the table is indexed through an arc of 60° to its next position. The knife is then pivoted downwardly again through the peck and the operation is repeated. Three such cuts are made through the peck to divide it into six wedge shaped pieces, suitable for insertion into the hashing machine.

For large scale operations a plurality of knives may be used for more rapid production. In this instance the knives are fixedly mounted for reciprocatory motion instead of being pivotable, as is the single reciprocating knife. In the illustrated embodiment two knives are arranged to reciprocate parallel to each other and a third knife is mounted to reciprocate substantially perpendicular to the first two and across them at a point approximately at their center so that the larger pecks are divided into six portions, four of wedge like shape and two of rectangular shape, and the smaller pecks are divided into four wedge shaped pieces. In each instance however, every piece will include a portion of the outer membrane of the peck to hold the piece together.

The foregoing and other objects of this invention, which will become more fully apparent from the following detailed description of embodiments thereof, may be achieved by the apparatus herein described by way of example, in connection with the illustrations of its structural components in the accompanying drawings, in which:

Figure 1 is a view in side elevation of a meat cutting machine constructed in accordance with the teachings of the present invention;

Fig. 2 is a view in vertical section taken along the plane represented by the line 2—2 of Figure 1 showing the indexing mechanism for the cutting table;

Fig. 3 is an enlarged view in vertical section taken along the plane represented by the line 3—3 in Figure 4;

Fig. 4 is a plan view of the machine illustrated in Figure 1;

Fig. 5 is a view partly in elevation and partly in vertical section taken along the plane represented by the line 5—5 in Fig. 4, illustrating the offset shaft supporting the reciprocating mechanism for pivoting movement;

Fig. 6 is an enlarged view in vertical section taken along the plane represented by the line 6—6 in Fig. 4, illustrating the roller support for retaining the knife in alignment;

Fig. 7 is a detailed view in side elevation illustrating the mounting of the horizontal aligning bar to the motor mounting plate;

Fig. 8 is a view substantially in side elevation illustrating another embodiment of the present invention;

Fig. 9 is a plan view of the machine depicted in Fig. 8, partly broken away to reveal the lower structure; and Fig. 10 is an enlarged view in vertical section taken along the plane represented by the line 10—10 in Fig. 8, showing the bearing structure for the reciprocating rods.

Referring more specifically to the drawings and particularly to Figs. 1 and 4 thereof, the cutting machine there illustrated comprises a main frame 15 in which is rotatably mounted a wooden table 16 which constitutes the cutting block of the machine.

An indexing mechanism, generally denoted by the numeral 17 in Figs. 1 and 2 is provided for indexing the table into six positions spaced sixty degrees apart. The indexing mechanism 17 is comprised of a channel shaped bracket 18 mounted on a horizontal member of the frame 15 and centrally located beneath the table 16. The bracket 18 includes two horizontally extending legs 19 and 20 parallelly disposed at the vertical ends of the bracket, each having a hole bored in it, the two holes being in alignment for receiving a pin 21.

The pin 21 is slidably retained in the holes by means of a handle 22 and a coil spring 23. The handle 22 is rigidly secured to the pin 21 and the spring 23 is coiled about the pin between the handle 22 and the leg 20 of the bracket 18 so that the spring is continually forcing the handle and consequently the pin 21 upwardly, with the leg 19 acting as a stop, to limit the upward movement of the handle 22. The pin 21, when forced into its upper position by the pressure of the spring 23, extends above the lower surface of the table 16, into any one of six holes 24, bored in the under side of the table, sixty degrees apart, in position to cooperate with the pin 21.

The table 16 is mounted on a flange 29 of a stub shaft 30 as shown in Figure 2. The shaft 30 is journaled in a bearing 31 formed in the frame 15 to provide for rotation of the table 16. The table 16 is provided with a rail 32 mounted to its periphery, for the convenience of the operator in rotating it.

With the pin 21 extending into one of the holes 24 the table 16 is locked in position. To release the table the operator pushes downwardly on the handle 22 against the pressure of the spring 23 to withdraw the pin 21 from the hole 24 with which it is engaged. The table 16 is rotated by grasping the rail 32, to move the cooperating hole 24 out of alignment with the pin 21 and the handle 22 is then released to permit the spring 23 to force the pin 21 against the under side of the table 16. Rotation of the table is continued until the next one of the holes 24 comes into alignment with the pin 21, whereupon the pin will enter the hole because of the pressure exerted upon it by the spring 23, to lock the table in its next position, the table having thus been indexed through an angle of sixty degrees.

Two legs 33 and 34 of the frame 15 extend upwardly above the table 16 and rotatably support a horizontal shaft 35 at their upper extremities. The shaft 35 extends through a pair of bearings 37 and 38 which carry a mounting plate 39, secured to the bearings by means of bolts 40. A shaft 45 is rigidly fastened to the under side of the mounting plate 39 by a pair of brackets 46 and 47 to extend transversely of the shaft 35 and is retained in the desired positions by set screws 48, threaded in the brackets.

The shaft 45 extends rightwardly of the mounting plate 39 as shown in Figs. 1 and 4 through a sleeve 49 and has a handle 50 integrally formed at its end opposite the mounting plate 39. As clearly shown in Fig. 3 an antifriction thrust bearing 53 is pressed into each end of the sleeve 49 to encircle the shaft 45 and provide for free axial movement of the sleeve 49 along the shaft 45.

Two vertical knife supporting members 54 and 55 are carried by the sleeve 49, the member 54 being clamped to the sleeve by a split circular end portion tightened to the sleeve by a bolt 56 passing through the two ends into threaded engagement with a nut 57. The member 55 is secured to the sleeve 49 in the same manner, having a split circular end portion which encircles the sleeve 49 and is clamped on the sleeve by a bolt 58 cooperating with a nut 59 as shown in Fig. 4.

The two members 54 and 55 support a knife 62 disposed between them at their ends opposite the sleeve 49. One end of the knife 62 is fastened to the support 54 by a pin 63 locked in position with a key 64, the end of the support 54 having a slit for receiving the knife 62. The other end of the knife 62 is carried by the support 55 which has an enlarged cylindrical portion 65 formed at its end. A stud 66 passes through a central bore in the cylindrical portion 65 and has a split end for receiving the knife 62 which is retained therein by a pin 67 locked in position with a key 68. The other end of the stud 66 is threaded to cooperate with a nut 69 which bears against an end of the cylindrical portion 65 to produce the desired tension on the knife 62, by varying the degree of tightness with which the nut 69 is drawn up against the cylindrical portion 65.

As illustrated in Fig. 4, the knife supporting assembly is retained in position by an aligning bar 73 secured at one end to the mounting bracket 39 by two bolts 74 as shown in the enlarged view in Fig. 7. The bolts 74 extend through the aligning bar 73 to engage cooperating threaded holes 75 formed in the mounting plate 39. The aligning bar 73 is supported at its other end by a bracket 76 fastened to the bar by a bolt 77. The bracket 76 in turn is carried by the shaft 45, being provided with an enlarged circular end portion 78 which is split to form a clamp for securing the bracket to the shaft. The clamping action is effected by tightening a bolt and nut assembly 79 arranged to tighten the split end portion 78 around the shaft 45, as clearly shown in Fig. 1.

Since the knife supporting assembly is mounted on the shaft 45 for reciprocatory movement by means of the antifriction bearings 53 it would also be free to pivot about the shaft. A retaining mechanism generally denoted by the numeral 83 in Fig. 4 is therefore provided to preclude such pivotal movement and retain the assembly in the proper vertical position.

The retaining mechanism 83 is comprised of a sleeve 84 adjustably mounted on the sleeve 49 and locked in the desired position by a set screw 85 threaded in the sleeve 84 to bear against the periphery of the sleeve 49. As shown in detail in Fig. 6, the sleeve 84 is provided with a threaded hole disposed oppositely of the set screw 84 for engagement with a threaded end portion 86 of a shaft 87. The end portion 86 of the shaft 87 extends through the sleeve 84 into an opening formed in the sleeve 49. A roller 88 is mounted on the end of the shaft 87 opposite the threaded end 86 and is retained thereon by a screw 89. The roller 88 is disposed to move within a groove 90 formed in the aligning bar 73 to cooperate therewith in retaining the knife 62 and its supporting assembly in a vertical position. The necessary adjustments are accomplished by loosening the set screw 85 and rotating the sleeve 84 to effect the proper positioning of the retaining mechanism 83 relative to the sleeve 49.

Reciprocatory movement of the knife 62 by power is obtained through an electric motor 95 adjustably carried by the mounting plate 39 and secured thereto with bolts 96 as illustrated in Fig. 1. The power is transmitted through a pulley 97 mounted on the motor shaft and a belt 98 which connects the pulley 97 with a pulley 99 keyed to a shaft 101. The shaft 101 is journaled in a bracket 102 secured to the under side of the mounting plate 39 by bolts 103.

A crank 107 is also keyed to the shaft 101 to rotate with it, and is provided with a crank pin 108 located at a distance from the center of the crank. A connecting rod 109 is pivotally fastened at one end to the crank pin 108, and its other end to the member 54 by means of a pin 110 to provide a driving connection between the crank 107 and the member 54. The crank 107 is caused to rotate by energization of the motor 95 and its rotary motion is converted to reciprocatory motion by the crank pin 108 and connecting rod 109 in well known manner, resulting in reciprocation of the knife 62.

It is essential that the cutting edge of the knife 62 lie flat on the table 16 at the end of the cutting stroke so that the material placed on the table is completely severed. Therefore, the height of the knife supporting and driving mechanism is readily adjustable as a unit, relative to the table 16, to provide for initial adjustment, as well as further adjustment upon each sharpening of the knife, which reduces its width, requiring a lowering of the mechanism to maintain full contact between the cutting edge of the knife and the table. If such adjustment were not provided, the knife when reduced in width by sharpening, would rest on the table 16 at an angle, to preclude complete severing of the material being cut.

To achieve this adjustment, the shaft 35, which supports the entire knife supporting and driving assembly as previously described, is provided with reduced end portions 114 and 115 of circular cross section, but with their axes offset from the axis of the shaft 35. These offset end portions 114 and 115 are concentric with each other and are journaled in the legs 33 and 34 respectively. Thus rotation of the shaft 35 is about the axes of its end portions 114 and 115 rather than about its own axis, causing the shaft 35 to move bodily in a gyratory path about the axes of its end portions.

The end portion 114 of the shaft 35 has threaded engagement with a nut 116 for locking the shaft 35 in position. The end portion 115 extends through a bushing 117 inserted in the leg 34 and is provided with a handle 118 at its end for manipulating the shaft 35. A threaded hole is formed in the bushing 117 for receiving a set screw 119 to retain the shaft 35 in the desired position. For the purpose of rigidity the set screw extends through a bushing 120 pressed into the leg 34 transversely of the axis of the shaft 35.

The mechanism is arranged so that when the knife 62 is new, the shaft 35 is positioned with its axis above the axes of the end portions 114 and 115. As the width of the knife is reduced due to sharpening, the mechanism is lowered by loosening the set screw 119 and revolving the shaft 35 to the right, as shown in Figs. 1 and 4, by manipulating the handle 118, to thereby lower the axis of the shaft 35 relative to the axes of the end portions 114 and 115 and thus lower unitarily, the entire knife supporting and driving mechanism. Upon completing the adjustment, the set screw 119 is tightened to lock the shaft 35 in the desired position and the mechanism is ready for operation.

The weight of the mechanism is so distributed that it will tend to pivot about the shaft 35 in a counterclockwise direction from the position shown in Fig. 1, whereby the knife 62 is normally raised away from the table 16. To perform the cutting operation the peck is placed on the table and the motor 95 energized to initiate reciprocation of the knife 62. The knife supporting and driving mechanism is then pivoted in a clockwise direction from its normal position by drawing the handle 50 down until the cutting edge of the knife contacts the upper surface of the table 16, when the peck is completely severed.

After the peck is severed the handle 50 is released to permit the mechanism the pivot to its normal position and raise the knife free of the peck. The table 16 is then indexed through sixty degrees by means of the indexing mechanism 17 and another cut is made through the peck. Three cuts are thus made through the peck to divide it into six wedge shaped pieces, with each piece including a portion of the outer membrane of the peck which tends to hold it together, as is desired.

In large scale operations a high production machine, as illustrated in Figs. 8 and 9, may be desired to reduce the amount of manual labor required as well as increase capacity, in performing the described cutting operation on the peck. The machine there shown is comprised of a base 125 supporting a pair of parallelly disposed channels 126 and 127 which in turn carry another pair of parallel channels 128 and 129 to form the supporting frame of the machine. The channel 128 rests on one end of the channel 126 and an end of the channel 127, while the channel 129 is supported by the other ends of the channels 126 and 127 to form a box like structure.

The channels 128 and 129 support a pair of horizontal and parallel knives 130 and 131, mounted with their cutting edges up, for axial reciprocatory movement. The knife 130 is mounted in a pair of bushings 135 and 136 by a pair of stub shafts 137 and 138 respectively, the stub shafts being supported by the bushings for axial movement. The knife 130 in turn is carried by the two shafts 137 and 138, being secured at one end to the shaft 137, and at the other end to the shaft 138. The shafts 137 and 138 are provided with slots at their ends for receiving the knives which are retained in the slots by Allen head screws 139, two of which are used for securing the knife to each shaft as illustrated in Fig. 9. Two bores 140 are formed transversely in the shafts 137 and 138, and extend from the periphery of the shafts to the slot formed through their center. The bores 140 are large enough to receive the head of the screws 139. The screws extend through a hole in the knife into threaded engagement with threaded holes 141 formed in the shafts concentric with the bores 140, but on the other side of the slot. The head of the screw 139 passes through the bore 140 to bear against the side of the knife and hold it rigidly against one side of the slot in the shafts when the screws 139 are tightened. The bushings 135 and 136 are secured to the channels 128 and 129 respectively, by bolts 142.

In like manner a pair of bushings 144 and 145 are mounted on the channels 128 and 129 respectively, in juxtaposition with the bushings 135 and 136 for supporting the knife 131. The knife 131 is carried by the bushings 144 and 145 through a pair of stub shafts 146 and 147, the knife being secured to the stub shafts 146 and 147 by screws 139 in the same manner as the knife 130 is secured to the stub shafts 137 and 138. The shaft 146 is slidably carried for axial movement within the bushing 144 and the shaft 147 is carried in like manner by the bushing 145.

A third knife 150 is transversely mounted beneath the knives 130 and 131 and centrally located. It is supported with its cutting edge up by a pair of bushings 151 and 152 through a pair of stub shafts 153 and 154 axially slidable within their cooperating bushings. The bushings 151 and 152 are mounted on the channels 126 and 127 respectively, and secured thereto by bolts 155. The knife 150 is attached to the stub shafts 153 and 154 by screws 139 in the same manner as the knives 130 and 131 are attached to their cooperating stub shafts.

As illustrated in Fig. 10 the stub shafts are precluded from rotating in their cooperating bushings by a key 158. The key is partially contained within a slot 159 formed in the bushing with the remainder of the key contained within a slot 160 formed in the shaft. This arrangement permits the shaft to move axially within its cooperating bushing but prevents rotary movement.

The knives are reciprocated by power to effect the cutting action. The knives 130 and 131 are driven in their reciprocatory movement by a single motor 165, depending from a mounting plate 166, and adjustably retained thereto by mounting bolts 167. The mounting plate 166 is secured at one end to the channel 129 by suitable bolts 168 and is supported at the opposite end by vertical members 169. The motor 165 drives a shaft 170 rotatably mounted on top of the plate 166 in bushings 171 and 172 which are secured to the plate by suitable bolts 173.

Power from the motor 165 is transmitted to the shaft 170 through a drive belt 178 having engagement with a pulley 179 keyed to the motor shaft and a pulley 180 keyed to the shaft 170. The belt 178 passes from the pulley 179 through a slot 181 in the plate 166 to engage the pulley 180. The ends of the shaft 170 extend beyond the bushings 171 and 172 to receive a pair of cranks 181 and 182 which are keyed to the shaft to rotate with it.

The crank 181 is provided with a crank pin 183, rigidly secured thereto, which serves as a bearing for engaging a connecting rod 184 with the crank 181. The other end of the connecting rod 184 is connected to the stub shaft 138 by means of a pin 185 passing through a slotted end of the shaft 138 and the connecting rod which extends into the slot.

A crank pin 188 is secured to the crank 182, located on the opposite end of the shaft 170, the crank pin being mounted away from the center of the crank. The crank pin 188 is journaled in one end of a connecting rod 189, the other end of which is pivotally retained in a split end of the stub shaft 147 by a pin 190, to constitute a driving connection between the crank 182 and the shaft 147.

Thus the rotary movement of the motor 165 is converted into reciprocatory movement to drive the knives 130 and 131 by the cranks 181 and 182 and their cooperating connecting rods 184 and 189 respectively. The cranks 181 and 182 are mounted on the shaft 170 so that their associated crank pins 183 and 188 respectively, are always in opposing positions to move the knives 130 and 131 in opposite directions. With this arrangement the material being cut is acted upon by the knives in opposite directions simultaneously.

The knife 150, located beneath the knives 130 and 131 is reciprocated in a similar manner by a motor 193 depending from a mounting plate 194. The motor 193 is adjustably secured to the mounting plate 194 by suitable bolts 195 extending through a slot in the mounting plate which is mounted at one end to the channel 127 by suitable bolts 196 and supported at its extending end by vertical members 197.

A pulley 198 is keyed to the shaft of the motor 193 and is connected to a pulley 199 by a drive belt 201, the pulley 199 being keyed to a shaft 202 to drive it. The shaft 202 is journalled in a pair of bearings 203 and 204 rigidly mounted on top of the plate 194 on either side of the pulley 199. The drive belt 201 passes upwardly from the pulley 198 to the pulley 199 through a slot 205 formed in the mounting plate 194. Thus, power from the motor 193 is transmitted to the shaft 202, through the pulley 198, the belt 201 and the pulley 199.

The rotary motion of the shaft 202 is converted into reciprocatory motion for driving the knife 150 by a crank 209 mounted on the end of the shaft 202 extending beyond the bearing 204, and a crank pin 210 secured to the crank 209 at a distance from its center. A connecting rod 211 is attached at one end to the crank pin 210 and at its other end to the stub shaft 154 by a pin 212 which extends through a slotted end of the shaft 154 and the connecting rod 211, the end of which is disposed within the slot. Thus, rotation of the crank 209 results in reciprocation of the connecting rod 211 and its associated shaft 154, to cause a corresponding reciprocation of the knife 150, since it is supported at one end by the shaft 154. The shaft 153, supporting the other end of the knife 150 will then be caused to move with the knife within its cooperating bearing 151.

The pecks are fed to the reciprocating knives through a hopper 215 mounted upon the frame of the machine. The hopper is comprised of two oppositely disposed inclined sides and two vertical sides. It is mounted to the frame by eight brackets 216, two of which are attached to each side of the hopper. The brackets 216 which support the hopper 215 at its inclined sides are mounted on the channels 128 and 129, while the other brackets, supporting the hopper at its vertical sides, are mounted to the channels 126 and 127.

The pecks are placed in the hopper 215, from which they are fed by gravity into the reciprocating knives 130 and 131. The peck is cut into three pieces as it passes through the knives 130 and 131, and these pieces drop onto the centrally located reciprocating knife 150 which cuts each of them in two. It is apparent then that the three reciprocating knives cut the larger pecks into six pieces, and the smaller pecks which will not cover the entire working surface of the knives into four pieces each of which includes a portion of the outer membrane of the peck, to hold it together.

To further reduce handling of the pieces a chute 217 is mounted at an angle beneath the knives to receive the pieces as they pass through the knives and direct them to an opening 218 cut in the floor. From the opening 218 the pieces may be fed into a hashing machine (not shown) for performing the next operation in processing the material.

From the foregoing description of the construction and operation of the two embodiments of the improved meat cutting machine provided by the present invention, it will be apparent that the apparatus is especially adapted to effectively perform the initial cutting operation in processing the omasum of cattle for the salvage of livestock feed and high quality tallow. The machine provides an efficient and rapid method of performing the operation with a minimum of physical effort on the part of the operator.

Although the illustrative embodiments of the invention have been described in considerable detail for the purpose of setting forth operative and practical exemplifying structures, it is to be understood that the structures shown and described are intended to be illustrative only, and that various characteristics of the invention may be incorporated in other structural forms without departing from the spirit and scope of the invention as defined in the subjoined claim.

The principles of the invention having now been fully explained in connection with the foregoing description of embodying structure, we hereby claim as our invention:

In a cutting machine of the type described, a supporting structure, a pair of knives slidably mounted on said supporting structure with their cutting edges up, a single knife slidably mounted on said supporting structure with its cutting edge up at a different level than and transverse to said pair of knives so that a mass of material passed through said three knives will be cut into six portions with each portion including a part of the peripheral surface of the mass for the purpose of holding the portion together, a pair of bearings carried by said supporting structure, a shaft journalled in said bearings, a crank keyed to each end of said shaft, a crank pin secured to each of said cranks at a distance from their axes, a pair of connecting rods each connected to one of said crank pins at one end and to one of said pair of knives at the other end to connect one of said pair of knives to one of said cranks, and the other of said pair of knives to the other of said cranks, a motor connected to rotate said shaft and its cooperating cranks to effect reciprocatory motion of said pair of knives, a second pair of bearings carried by said supporting structure, a second shaft journalled in said second pair of bearings, a third crank keyed to one end of said second shaft, a third crank pin secured to said third crank at a distance from its axis, a third connecting rod connected at one end to said third crank pin and at the other end to said single knife to connect said single knife to said third crank, and a second motor connected to rotate said second shaft and its cooperating crank to effect reciprocatory motion of said single knife, whereby a mass of material may be dropped through said reciprocating knives to divide it into several portions.

References Cited in the file of this patent

UNITED STATES PATENTS

| Number | Name | Date |
|---|---|---|
| 1,991,554 | Haynes | Feb. 19, 1935 |
| 1,999,449 | Erickson | Apr. 30, 1935 |
| 2,115,102 | Gottfried et al. | Apr. 26, 1938 |
| 2,232,311 | Bridge | Feb. 18, 1941 |
| 2,420,930 | Bush | May 20, 1947 |
| 2,436,703 | Thomas | Feb. 24, 1948 |
| 2,490,455 | Nelson | Dec. 6, 1949 |
| 2,609,564 | Grimm | Sept. 9, 1952 |